United States Patent
Lin et al.

(10) Patent No.: US 8,352,760 B2
(45) Date of Patent: Jan. 8, 2013

(54) POWER SUPPLY CIRCUIT AND MOTHERBOARD INCLUDING THE SAME

(75) Inventors: Ping-Kun Lin, Taipei Hsien (TW); Na Zhou, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 244 days.

(21) Appl. No.: 12/908,011

(22) Filed: Oct. 20, 2010

(65) Prior Publication Data
US 2012/0023341 A1    Jan. 26, 2012

(30) Foreign Application Priority Data
Jul. 21, 2010  (CN) .......................... 2010 1 0232813

(51) Int. Cl.
*G06F 1/26* (2006.01)
*G06F 13/14* (2006.01)
(52) U.S. Cl. ........................ 713/300; 710/305
(58) Field of Classification Search .......... 713/300–340; 710/300–304, 305–306, 316
See application file for complete search history.

(56) References Cited

U.S. PATENT DOCUMENTS

| | | | |
|---|---|---|---|
| 6,564,275 B1 * | 5/2003 | Chen | 710/107 |
| 6,675,250 B1 * | 1/2004 | Ditner et al. | 710/305 |
| 7,484,109 B2 * | 1/2009 | Feldman et al. | 713/300 |
| 7,802,043 B2 * | 9/2010 | Hauck et al. | 710/304 |
| 7,953,670 B2 * | 5/2011 | Colella | 705/64 |
| 8,018,699 B2 * | 9/2011 | Smith et al. | 361/91.1 |
| 8,050,061 B2 * | 11/2011 | Tai et al. | 363/40 |
| 8,166,331 B2 * | 4/2012 | Zou | 713/330 |
| 2011/0055600 A1 * | 3/2011 | Hu | 713/300 |
| 2011/0191605 A1 * | 8/2011 | Pan et al. | 713/300 |

* cited by examiner

*Primary Examiner* — Paul R Myers
*Assistant Examiner* — Trisha Vu
(74) *Attorney, Agent, or Firm* — Altis Law Group, Inc.

(57) ABSTRACT

A power supply circuit includes a power controller and a switch. The power controller is connected to a Southbridge chip of a motherboard. The Southbridge chip outputs status signals of the motherboard. The power controller provides a +5V_SYS voltage or a +5V_SB voltage to a universal serial bus (USB) connector according to the status signals. The switch is connected to the USB connector, a USB controller, and the Southbridge chip. The switch connects or disconnects from the USB connector and the USB controller according to the status signals.

8 Claims, 3 Drawing Sheets

POWER SUPPLY CIRCUIT AND MOTHERBOARD INCLUDING THE SAME

BACKGROUND

1. Technical Field

The present disclosure relates to a power supply circuit and a motherboard including the power supply circuit.

2. Description of Related Art

When a computer system is turned off, a power supply unit of the computer system turns off all of the voltages to the system except the 5-volt standby (5V_SB) voltage. At this time, a universal serial bus (USB) device connected to the computer system by a USB connector will not receive power even though it may need to be charged, which is inconvenient.

DETAILED DESCRIPTION

Figure 1:
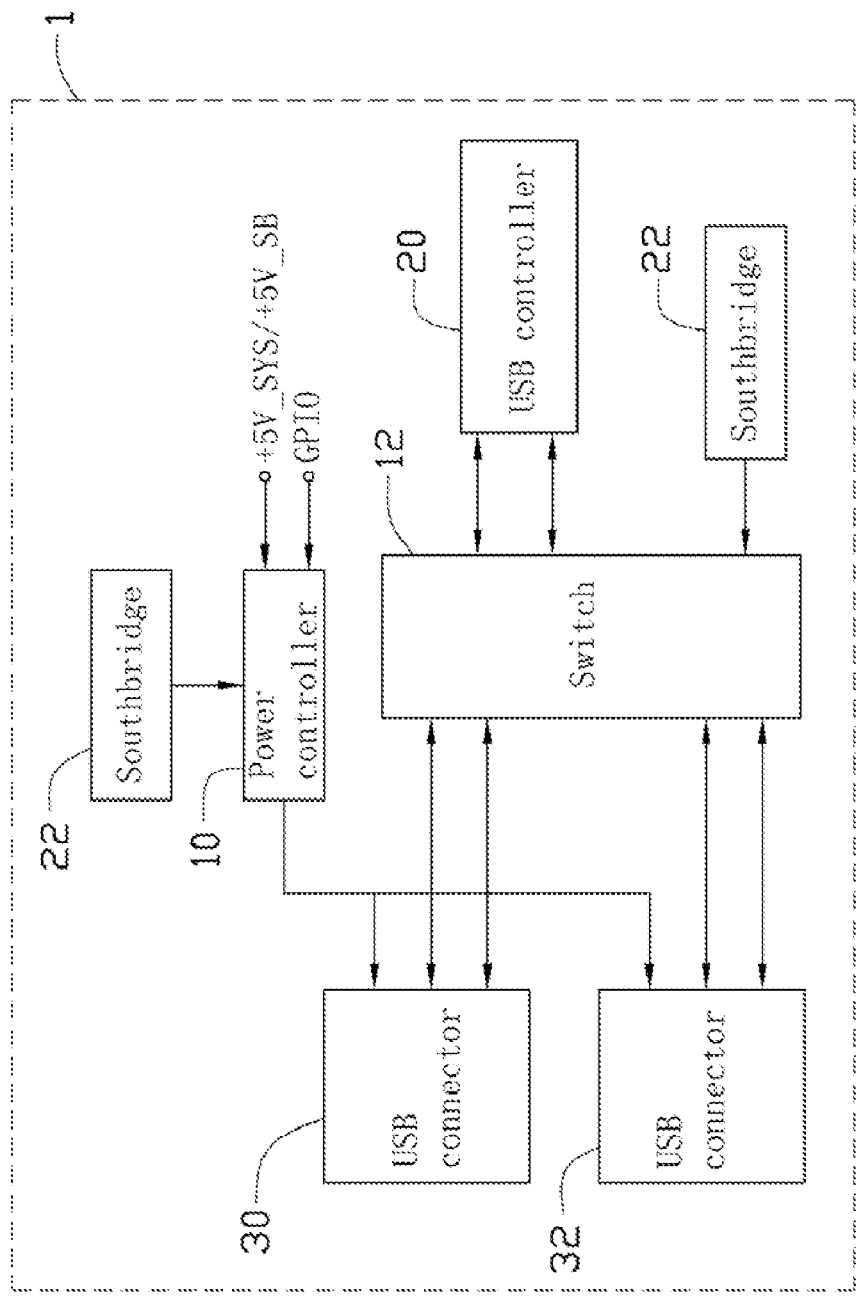
FIG. 1 is a schematic diagram of an exemplary embodiment of a power supply circuit, the power supply circuit including a power controller and a switch.

Referring to FIG. 1, an exemplary embodiment of a power supply circuit includes a power controller 10 and a switch 12. The power supply circuit is set on a motherboard 1 of a computer system. When the computer system is at work, the power controller 10 provides a 5-volt system (+5V_SYS) voltage to a universal serial bus (USB) connector 30 and a USB connector 32 for supplying power to USB devices which are connected to the USB connectors 30 and 32. The switch 12 controls data transmission between the USB devices and a USB controller 20.

When the computer system is not at work, the power controller 10 provides a 5-volt standby (+5V_SB) voltage to the USB connector 30 and the USB connector 32 for charging the USB devices connected to the USB connector 30 and 32. At this time, the switch 12 is off and disconnects the USB devices from the USB controller 20.

Figure 2:
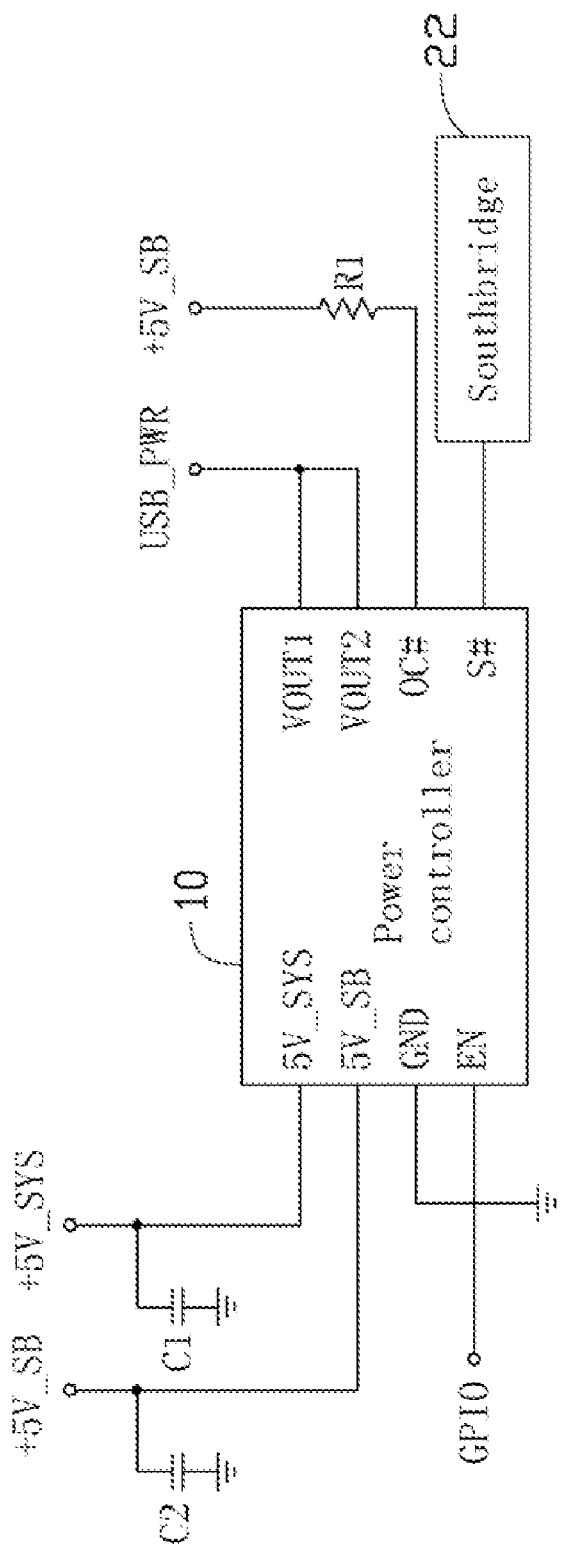
FIG. 2 is a circuit diagram of the power controller in FIG. 1.

Referring to FIG. 2, a first power pin 5V_SYS of the power controller 10 is capable of receiving a +5V_SYS voltage from the motherboard 1. The first power pin 5V_SYS is grounded through a capacitor C1. A second power pin 5V_SB of the power controller 10 is capable of receiving a +5V_SB voltage from the motherboard 1. The second power pin 5V_SB is grounded through a capacitor C2. A ground pin GND of the power controller 10 is grounded. A first output pin VOUT1 and a second output pin VOUT2 of the power controller 10 are connected to power pins of the USB connectors 30 and 32 for supplying the +5V_SYS voltage and the +5V_SB voltage to the USB connectors 30 and 32. The first output pin VOUT1 and the second output pin VOUT2 further are connected together. An over-current detection pin OC# of the power controller 10 is capable of receiving the +5V_SB voltage from the motherboard 1 through a resistor R1. A status pin S# of the power controller 10 connects to a Southbridge chip 22 of the motherboard 1 for receiving a SLP_S4 signal and a SLP_S5 signal which indicate whether the motherboard 1 is at work or not at work. An enable pin EN of the power controller 10 is connected to a general purpose input/output (GPIO) pin of the motherboard.

Figure 3:
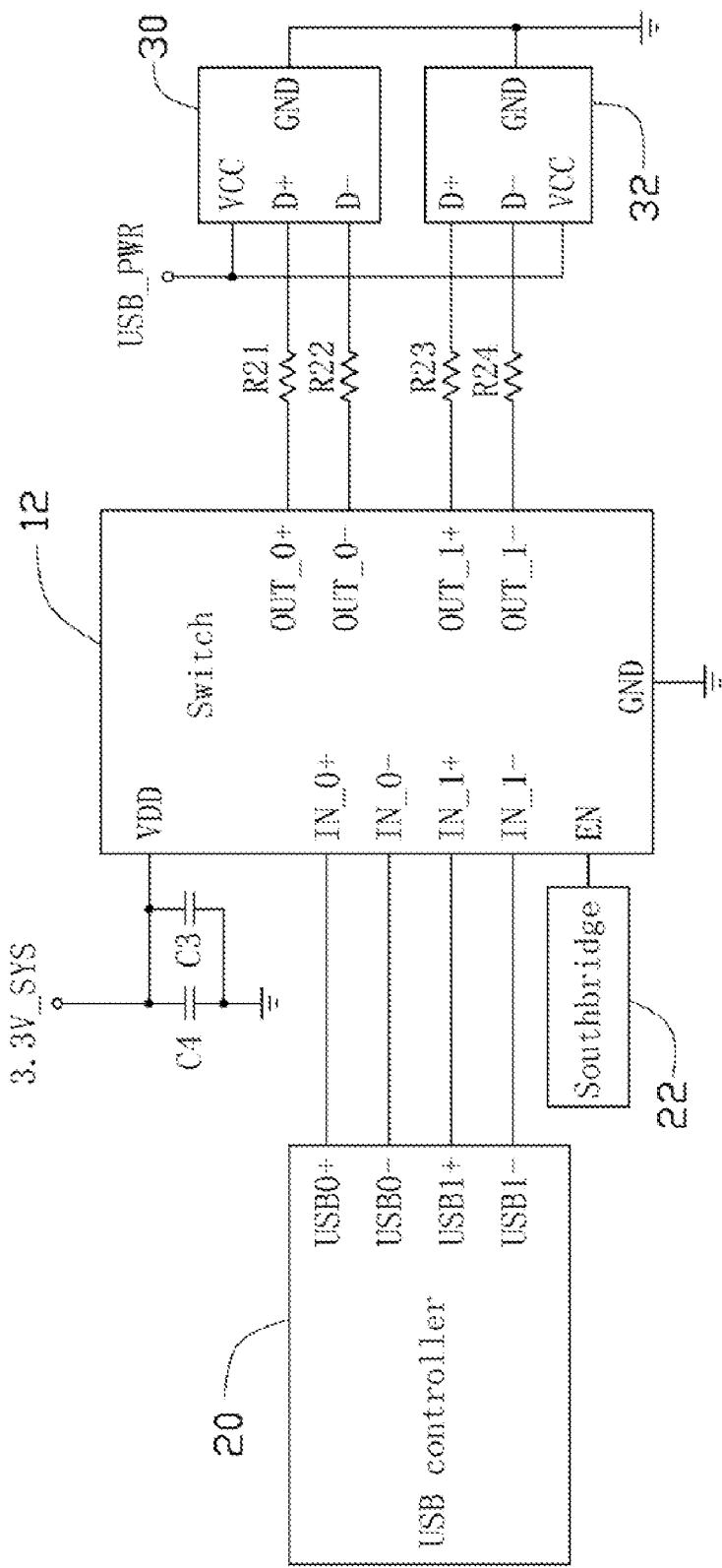
FIG. 3 is a circuit diagram of the switch and a USB connector in FIG. 1.

Referring to FIG. 3, a power pin VDD of the switch 12 is capable of receiving a 3.3-volt system (+3.3V_SYS) voltage from the motherboard 1. The power pin VDD is grounded through a capacitor C3. The capacitor C3 is connected to a capacitor C4 in parallel. A ground pin GND of the switch 12 is grounded. A first input pin IN_0+ of the switch 12 is connected to a first input/output pin USB0+ of the USB controller 20. A second input pin IN_0− of the switch 12 is connected to a second input/output pin USB0− of the USB controller 20. A third input pin IN_1+ of the switch 12 is connected to a third input/output pin USB1+ of the USB controller 20. A fourth input pin IN_1− of the switch 12 is connected to a fourth input/output pin USB1− of the USB controller 20. A first output pin OUT_0+ of the switch 12 is connected to a first data pin D+ of the USB connector 30 through a resistor R21. A second output pin OUT_0− of the switch 12 is connected to a second data pin D− of the USB connector 30 through a resistor R22. A third output pin OUT_1+ of the switch 12 is connected to a first data pin D+ of the USB connector 32 through a resistor R23. A fourth output pin OUT_1−− of the switch 12 is connected to a second data pin D− of the USB connector 32 through a resistor R24. An enable pin EN of the switch 12 is connected to the Southbridge chip 22 for receiving the SLP_S4 signal and SLP_S5 signal. Both power pins VCC of the USB connectors 30 and 32 are connected to the first output pin VOUT1 and the second output pin VOUT2 of the power controller 10 for receiving power USB_PWR. Both ground pins GND of the USB connectors 30 and 32 are grounded.

When the computer system is at work, the motherboard 1 outputs the +5V_SYS voltage, the +5V_SB voltage, and the +3.3V_SYS voltage, at this time, the GPIO pin of the motherboard outputs a high level signal to the enable pin EN of the power controller 10 to activate the power controller 10. In addition, the SLP_S4 signal and the SLP_S5 signal output from the Southbridge chip 22 are at high level. As a result, the power controller 10 provides the +5V_SYS voltage to the USB connectors 30 and 32. The SLP_S4 signal, the SLP_S5 signal and +3.3V_SYS voltage activate the switch 12. The switch 12 is on and the USB connectors 30 and 32 communicate with the USB devices. At this time, the USB devices connected to the USB connector 30 and 32 can be charged.

When the computer system is not at work, the motherboard 1 turns off all of the voltages except for the +5V_SB voltage, at this time, the GPIO pin of the motherboard 1 outputs a high level signal to the enable pin EN of the power controller 10. The power controller 10 is still at work. In addition, the SLP_S4 signal and the SLP_S5 signal output from the Southbridge chip 22 are at a low level. As a result, the power controller 10 provides the +5V_SB voltage to the USB connectors 30 and 32. Because the motherboard 1 turns off +3.3V_SYS voltage, the switch 12 is off and the USB controller 20 is disconnected from USB connectors 30 and 32, however, at this time, the USB devices connected to the USB connector 30 and 32 can still be charged.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A power supply circuit, comprising:
a power controller connected to a Southbridge chip of a motherboard, wherein the Southbridge chip outputs status signals of the motherboard, the power controller provides a 5-volt system (+5V_SYS) voltage or a 5-volt standby (+5V_SB) voltage to a universal serial bus (USB) connector according to the status signals; wherein a first power pin of the power controller is capable of receiving a +5V_SYS voltage from the motherboard, a second power pin of the power controller is capable of receiving a +5V_SB voltage of the motherboard, an output pin of the power controller is connected to the USB connector for supplying the +5V_SYS voltage or the +5V_SB voltage to the USB connector, a status pin of the power controller is connected to the Southbridge chip, an enable pin of the power controller is connected to a general purpose input/output pin of the motherboard; and
a switch connected to the USB connector, a USB controller, and the Southbridge chip, wherein the switch connects or disconnects the USB connector and the USB controller according to the status signals.

2. The power supply circuit of claim 1, wherein the first power pin is further grounded through a first capacitor.

3. The power supply circuit of claim 1, wherein the second power pin is further grounded through a second capacitor.

4. The power supply circuit of claim 1, wherein two input pins of the switch are connected to two input/output pins of the USB connector respectively, two output pins of the switch are connected to two data pins of the USB connector respectively, and an enable pin of the switch is connected to the Southbridge chip.

5. A motherboard, comprising:
a Southbridge chip outputting status signals of the motherboard;
a universal serial bus (USB) connector; and
a power supply circuit, comprising:
a power controller connected to the Southbridge chip, wherein the power controller provides a 5-volt system (+5V_SYS) voltage or a 5-volt standby (+5V_SB) voltage to the USB connector according to the status signals; wherein a first power pin of the power controller is capable of receiving a +5V_SYS voltage from the motherboard, a second power pin of the power controller is capable of receiving a +5V_SB voltage from the motherboard, an output pin of the power controller is connected to the USB connector for supplying the +5V_SYS voltage or the +5V_SB voltage to the USB connector, a status pin of the power controller is connected to the Southbridge chip, an enable pin of the power controller is connected to a general purpose input/output pin of the motherboard; and
a switch connected to the USB connector, the USB controller, and the Southbridge chip, wherein the switch connects or disconnects the USB connector and the USB controller according to the status signals.

6. The motherboard of claim 5, wherein the first power pin is further grounded through a first capacitor.

7. The motherboard of claim 5, wherein the second power pin is further grounded through a second capacitor.

8. The motherboard of claim 5, wherein two input pins of the switch are connected to two input/output pins of the USB connector respectively, two output pins of the switch are connected to two data pins of the USB connector respectively, and an enable pin of the switch is connected to the Southbridge chip.

* * * * *